(12) United States Patent
Kubota et al.

(10) Patent No.: US 9,091,793 B2
(45) Date of Patent: Jul. 28, 2015

(54) IMAGING LENS

(71) Applicants: OPTICAL LOGIC INC., Ina-shi, Nagano (JP); KANTATSU CO., LTD., Yaita-shi, Tochigi (JP)

(72) Inventors: Yoji Kubota, Ina (JP); Kenichi Kubota, Ina (JP); Hitoshi Hirano, Ina (JP); Ichiro Kurihara, Yaita (JP); Tomohiro Yonezawa, Yaita (JP)

(73) Assignees: OPTICAL LOGIC INC., Nagano (JP); KANTATSU CO., LTD., Tochigi (JP)

( * ) Notice: Subject to any disclaimer, the term of this patent is extended or adjusted under 35 U.S.C. 154(b) by 63 days.

(21) Appl. No.: 13/712,235

(22) Filed: Dec. 12, 2012

(65) Prior Publication Data
US 2013/0170051 A1 Jul. 4, 2013

(30) Foreign Application Priority Data
Dec. 28, 2011 (JP) ................................ 2011-287076

(51) Int. Cl.
 *G02B 9/14* (2006.01)
 *G02B 3/00* (2006.01)
 *G02B 13/00* (2006.01)
(52) U.S. Cl.
 CPC .............. *G02B 3/00* (2013.01); *G02B 13/0035* (2013.01)

(58) Field of Classification Search
 CPC .............................. G02B 13/0035; G02B 3/00
 USPC .......... 359/716, 661, 784, 785, 695, 689–690
 See application file for complete search history.

(56) References Cited

U.S. PATENT DOCUMENTS

| | | | | |
|---|---|---|---|---|
| 7,515,358 B2 * | 4/2009 | Noda | ............................. | 359/785 |
| 8,164,840 B2 * | 4/2012 | Chen et al. | .................... | 359/784 |
| 2011/0279910 A1 | 11/2011 | Tang et al. | | |

FOREIGN PATENT DOCUMENTS

JP        2008-076594 A      4/2008

* cited by examiner

*Primary Examiner* — Thomas K Pham
*Assistant Examiner* — Vipin Patel
(74) *Attorney, Agent, or Firm* — Kubotera & Associates, LLC

(57) ABSTRACT

An imaging lens includes a first lens having positive refractive power; a second lens having negative refractive power; and a third lens having positive refractive power, arranged in this order from an object side to an image plane side. Further, the first lens is formed in a shape so that a curvature radius of a surface thereof on the object side is positive. The second lens is formed in a shape so that a curvature radius of a surface thereof on the object side is negative and a curvature radius of a surface thereof on the image plane side is positive. The third lens is formed in a shape so that a curvature radius of a surface thereof on the object side and a curvature radius of a surface thereof on the image plane side are both positive.

3 Claims, 9 Drawing Sheets

IMAGING LENS

BACKGROUND OF THE INVENTION AND RELATED ART STATEMENT

The present invention relates to an imaging lens for forming an image of an object on an imaging element such as a CCD sensor and a CMOS sensor. More particularly, the present invention relates to an imaging lens suitable for mounting in a relatively small camera such as a cellular phone, a digital still camera, a portable information terminal, a security camera, an onboard camera, and a network camera.

An imaging lens to be mounted in a small-sized camera is required to have a lens configuration with high resolution that can be suitably applied to an imaging element of high resolution that is available in these years, in addition to having a small size. Conventionally, there have been various proposals for lens configurations, and among them, an imaging lens with a three-lens configuration has been used in many cameras since it is possible to relatively satisfactorily correct aberrations and easily achieve miniaturization.

For such an imaging lens with the three-lens configuration, for example, an imaging lens described in Patent Reference has been known. The imaging lens includes a first lens having positive refractive power; a second lens having negative refractive power; and a third lens having positive refractive power, arranged in the order from an object side. According to the configuration, the third lens has shorter focal length than that of the whole lens system, i.e., the third lens has relatively strong refractive power, and at the same time, the second lens has stronger refractive power than the first lens, so as to correct field curvature, coma aberration, and so on.

Patent Reference: Japanese Patent Application Publication No. 2008-76594

In these years, starting with the cellular phone, there have been rapid advancements in miniaturization and higher resolution of the cameras, and demands for performances of the imaging lenses have been even higher than before. According to the imaging lens described in Patent Reference, although it is possible to relatively satisfactorily correct aberrations, since the whole lens system has a long focal length, the length of the imaging lens on an optical axis is long and there is limitation in miniaturization of the imaging lens.

Here, such a requirement of attaining both miniaturization and aberration correction is not only a challenge specific to the imaging lens for mounting in a cellular phone, but also a challenge for an imaging lens for mounting in a relatively small camera, such as digital still cameras, portable information terminals, security cameras, onboard cameras, and network cameras.

In view of the above-described problems in the conventional techniques, an object of the present invention is to provide an imaging lens that can satisfactorily correct aberrations despite of a small size thereof.

Further objects and advantages of the invention will be apparent from the following description of the invention.

SUMMARY OF THE INVENTION

In order to attain the objects described above, according to an aspect of the present invention, an imaging lens includes a first lens having positive refractive power; a second lens having negative refractive power; and a third lens having positive refractive power, arranged in this order from an object side to an image plane side.

According to the aspect of the present invention, the first lens is formed in a shape so that a curvature radius of a surface thereof on the object side is positive. The second lens is formed in a shape so that a curvature radius of a surface thereof on the object side is negative and a curvature radius of a surface thereof on the image plane side is positive. The third lens is formed in a shape so that a curvature radius of a surface thereof on the object side and a curvature radius of a surface thereof on the image plane side are both positive.

According to the aspect of the present invention, when the whole lens system has a focal length f, a composite focal length of the first lens and the second lens is f12, a distance on an optical axis from the image plane-side surface of the first lens to the object-side surface of the second lens is T1, and a distance on the optical axis from the image plane-side surface of the second lens to the object-side surface of the third lens is T2, the imaging lens of the invention satisfies the following conditional expressions (1) and (2):

$$4.0 < f12/f < 10.0 \quad (1)$$

$$1.0 < T1/T2 < 2.0 \quad (2)$$

When the imaging lens satisfies the conditional expression (1), it is possible to restrain an astigmatism within satisfactory range while attaining miniaturization of the imaging lens. In addition, when the imaging lens satisfies the conditional expression (1), it is also possible to restrain an incident angle of a light beam emitted from the imaging lens to an imaging element within certain range. When the value exceeds the upper limit "10.0", in the first lens and the second lens, the first lens has relatively weak positive refractive power, so that it is difficult to attain miniaturization of the imaging lens. An off-axis chromatic aberration of magnification is insufficiently corrected since an image-forming point at a short wavelength moves in a direction to approach the optical axis in relation to an image-forming point at a reference wavelength. Moreover, in the astigmatism, a sagittal image surface curves towards the object side, so that it is difficult to obtain satisfactory image-forming performance.

On the other hand, when the value is below the lower limit "4.0", in the first lens and the second lens, since the first lens has relatively strong positive refractive power, it is advantageous for miniaturization of the imaging lens. An axial chromatic aberration is insufficiently corrected since a focal position at a short wavelength moves towards the object side in relation to a focal position at a reference wavelength. In addition, an off-axis chromatic aberration of magnification is insufficiently corrected. Therefore, also in this case, it is difficult to obtain satisfactory image-forming performance. Here, in this case, since an incident angle of an off-axis chief ray emitted from the imaging lens to the imaging element increases, there remains a concern of occurrence of a shading phenomenon.

When the imaging lens satisfies the conditional expression (2), it is possible to restrain chromatic aberrations and a field curvature within satisfactory ranges. When the value exceeds the upper limit "2.0", although it is advantageous for correcting a chromatic aberration of magnification, an axial chromatic aberration is insufficiently corrected. In addition, since the periphery of an image surface curves towards the image plane side, it is difficult to obtain satisfactory image-forming performance.

On the other hand, when the value is below the lower limit "1.0", although it is advantageous for correcting the axial chromatic aberration, the off-axis chromatic aberration of magnification is insufficiently corrected. Furthermore, since the periphery of an image surface curves towards the object side, also in this case, it is difficult to obtain satisfactory image-forming performance.

When a curvature radius of the image plane-side surface of the second lens is R2r and a curvature radius of the object-side surface of the third lens is R3f, the imaging lens having the above-described configuration preferably satisfies the following conditional expression (3):

$$2.0 < R2r/R3f < 35.0 \qquad (3)$$

When the imaging lens satisfies the conditional expression (3), it is possible to have image surface positions in an axial direction, which varies with wavelength, close to each other while restraining an astigmatism within satisfactory range. When the value exceeds the upper limit "35.0", the second lens and the third lens have weak refractive powers relative to the refractive power of the whole lens system, and in the astigmatism, a sagittal image surface tilts in a negative direction (towards the object side). Therefore, it is difficult to obtain satisfactory image-forming performance. On the other hand, when the value is below the lower limit "2.0", the second lens and the third lens have strong refractive powers relative to the refractive power of the whole lens system. In the astigmatism, since a sagittal image surface tilts in a positive direction (towards the image plane side) and an astigmatic difference increases, it is difficult to restrain the astigmatism within satisfactory range. In addition, an image surface at a short wavelength moves in a negative direction (towards the object side), an image surface position in an axial direction at a long wavelength and an image surface position in an axial direction at a short wavelength are away from each other, so that it is difficult to obtain satisfactory image-forming performance.

When a curvature radius of an image plane-side surface of the second lens is R2r, the imaging lens having the above-described configuration preferably satisfies the following conditional expression (4):

$$0.6 < R2r/f < 10.0 \qquad (4)$$

When the imaging lens satisfies the conditional expression (4), it is possible to keep flatness of an image surface while attaining miniaturization of the imaging lens, and also restrain distortion within satisfactory range. When the value exceeds the upper limit "10.0", since a curvature radius of the image plane-side surface of the second lens is large relative to the focal length of the whole lens system, a position of a principal point of the whole lens system moves towards the image plane side, and it is difficult to attain miniaturization of the imaging lens.

Moreover, plus distortion occurs and it is difficult to obtain satisfactory image-forming performance. On the other hand, when the value is below the lower limit "0.6", since a curvature radius of the image plane-side surface of the second lens is small relative to the focal length of the whole lens system, a position of the principal point of the whole lens system moves towards the object side. For this reason, although it is advantageous for miniaturization of the imaging lens, the periphery of the imaging surface tilts in the negative direction (towards the object side) and it is difficult to obtain satisfactory image-forming performance.

According to the imaging lens of the invention, it is possible to attain both miniaturization and satisfactory aberration correction of the imaging lens and provide a small-sized imaging lens with satisfactorily corrected aberrations.

DETAILED DESCRIPTION OF THE PREFERRED EMBODIMENTS

Hereunder, referring to the accompanying drawings, an embodiment of the present invention will be fully described.

Figure 1:
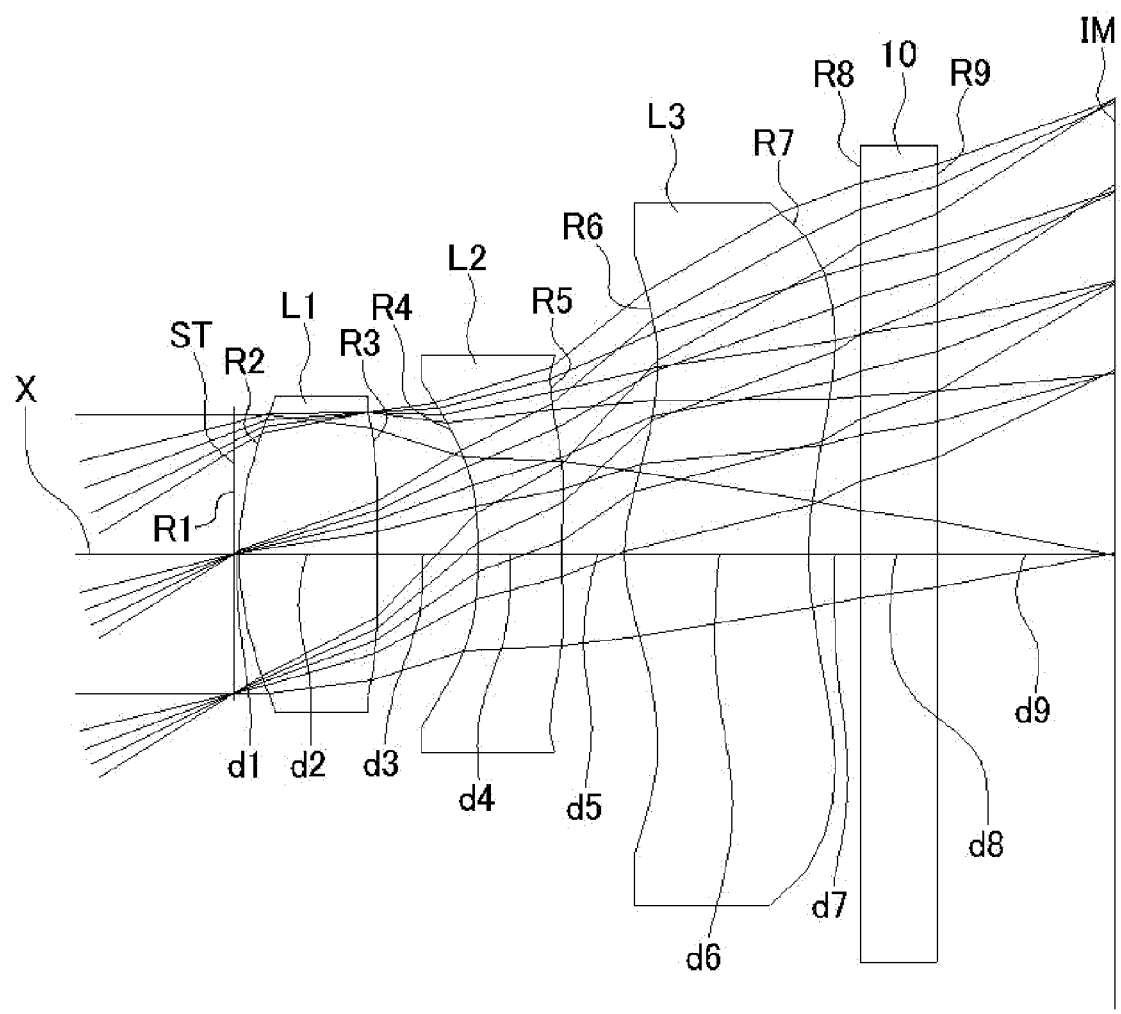
FIG. 1 shows a schematic sectional view of an imaging lens in Numerical Data Example 1 according to an embodiment of the invention.
Figure 4:
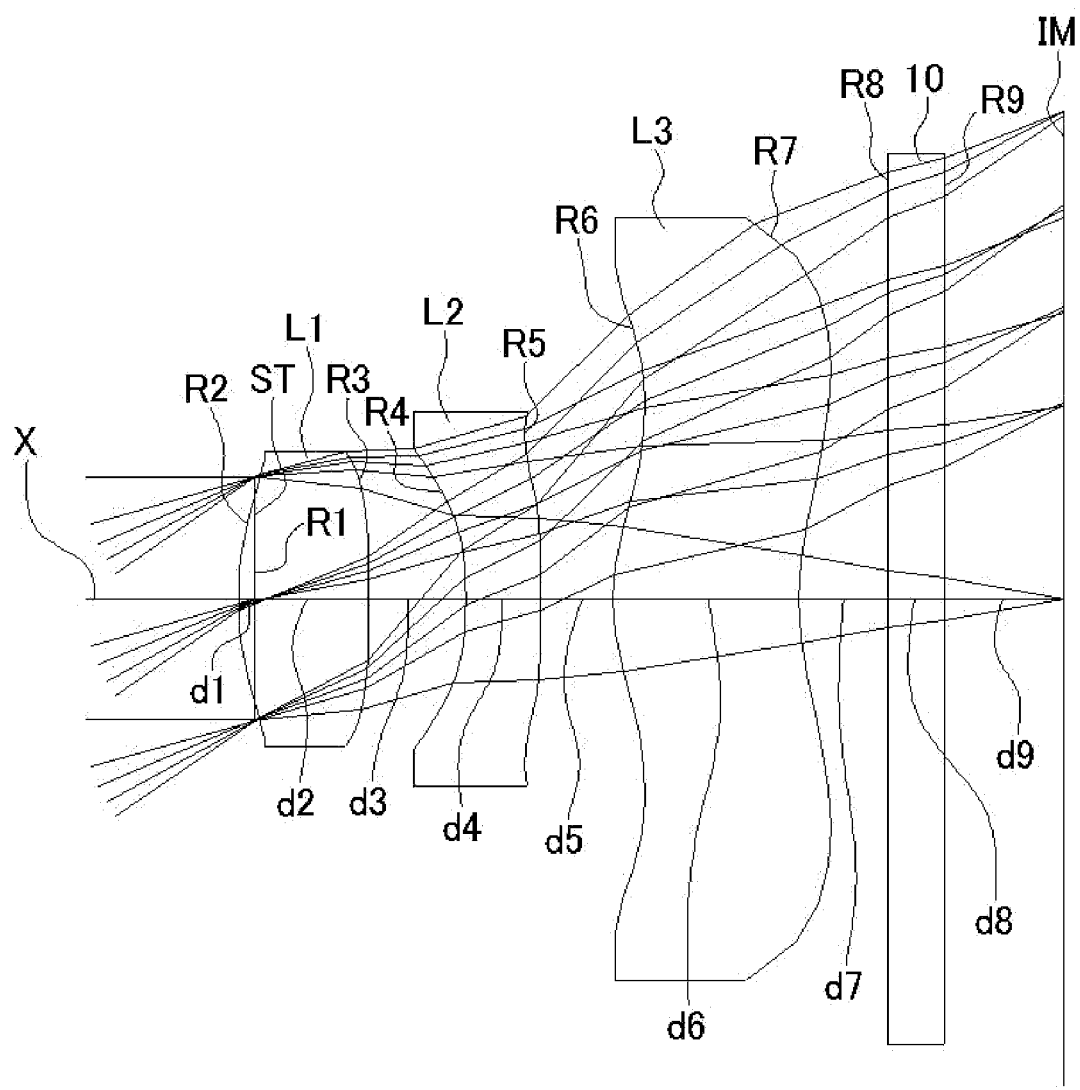
FIG. 4 shows a schematic sectional view of an imaging lens in Numerical Data Example 2 according to the embodiment of the invention.
Figure 7:
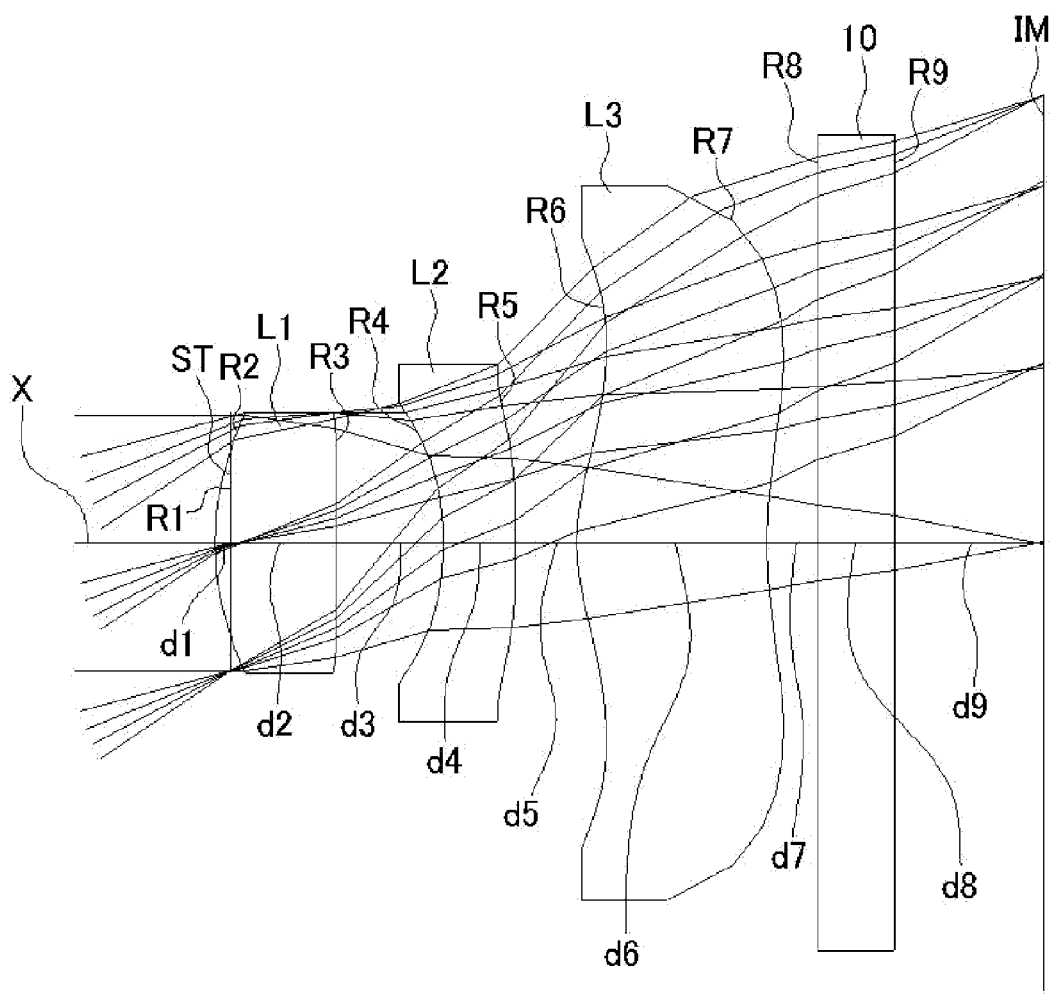
FIG. 7 shows a schematic sectional view of an imaging lens in Numerical Data Example 3 according to the embodiment of the invention.

FIGS. 1, 4, and 7 are schematic sectional views of imaging lenses in Numerical Data Examples 1 to 3 according to the embodiment, respectively. Since a basic lens configuration is the same among those Numerical Data Examples, the lens configuration of the embodiment will be described with reference to the schematic sectional view of Numerical Data Example 1.

As shown in FIG. 1, the imaging lens includes a first lens L1 having positive refractive power, a second lens L2 having negative refractive power, and a third lens L3 having positive refractive power, arranged in the order from an object side to an image plane side. A filter 10 may be provided between the third lens L3 and an image plane IM of an imaging element. The filter 10 may be optionally omitted.

Here, according to the imaging lens of Numerical Data Example 1, there is provided an aperture stop ST being close to an object side in relation to an object-side surface of the first lens L1. A position of the aperture stop ST is not limited to the one indicated in the imaging lens of Numerical Data Example 1. Numerical Data Example 2 and Numerical Data Example 3 are examples in which the aperture stop ST is provided between a tangential surface at a vertex of the object-side surface of the first lens L1 and the image plane-side surface thereof.

According to the imaging lens of the embodiment, the first lens L1 is formed in a shape so that a curvature radius R2 of the object-side surface thereof and a curvature radius R3 of the image plane-side surface thereof are both positive, i.e. a shape of a meniscus lens directing a convex surface thereof to the object side near an optical axis X. Here, the shape of the first lens L1 is not limited to the shape of the meniscus lens directing a convex surface thereof to the object side near the optical axis X, and can be any as long as a curvature radius R2 of the object-side surface thereof is positive. More specifically, the first lens L1 may be formed in a shape so that the curvature radius R2 is positive and the curvature radius R3 is negative, i.e. a shape of a biconvex lens near the optical axis X. Numerical Data Example 2 is an example in which the first lens L1 is formed in a shape of a biconvex lens near the optical axis X.

The second lens L2 is formed in a shape so that a curvature radius R4 of an object-side surface thereof is negative and a curvature radius R5 of an image plane-side surface thereof is positive, i.e. a shape of a biconcave lens near the optical axis X. The third lens L3 is formed in a shape so that a curvature radius R6 of an object-side surface thereof and a curvature radius R7 of an image plane-side surface thereof are both positive, i.e. a shape of a meniscus lens directing a convex surface thereof to the object side near the optical axis X. Here, according to the embodiment, the third lens L3 is formed in a shape as an aspheric shape so that an object-side surface thereof and an image plane-side surface thereof are both convex to the object side near the optical axis X and concave to the object side at the periphery.

The imaging lens of the embodiment satisfies the following conditional expressions (1) to (4):

$$4.0 < f12/f < 10.0 \quad (1)$$

$$1.0 < T1/T2 < 2.0 \quad (2)$$

$$2.0 < R2r/R3f < 35.0 \quad (3)$$

$$0.6 < R2r/f < 10.0 \quad (4)$$

In the above conditional expressions,
f: Focal length of the whole lens system
f12: Composite focal length of a first lens L1 and a second lens L2
T1: Distance on an optical axis between the first lens L1 and the second lens L2
T2: Distance on the optical axis between the second lens L2 and the third lens L3
R2r: Curvature radius of an image plane-side surface of the second lens L2 (=R5)
R3f: Curvature radius of an object-side surface of the third lens L3 (=R6)

Here, it is not necessary to satisfy all of the above conditional expressions, and it is possible to obtain an effect corresponding to the respective conditional expression when any single one of the conditional expressions is individually satisfied.

In the embodiment, any lens surfaces of the first lens L1 to the third lens L3 are formed as an aspheric surface. When the aspheric surfaces applied to the lens surfaces have an axis Z in a direction of the optical axis X, a height H in a direction perpendicular to the optical axis X, a conical coefficient k, and aspheric coefficients $A_4, A_6, A_8, A_{10}, A_{12}, A_{14}$, and $A_{16}$, a shape of the aspheric surfaces of the lens surfaces may be expressed as follows:

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16} \quad \text{[Formula 1]}$$

Next, Numerical Data Examples of the imaging lens of the embodiment will be described. In each Numerical Data Example, f represents a focal length of the whole lens system, Fno represents an F number, and ω represents a half angle of view, respectively. In addition, i represents a surface number counted from the object side, R represents a curvature radius, d represents a distance between lens surfaces (surface spacing) on the optical axis, Nd represents a refractive index for a d line (a reference wavelength in the embodiment), and νd represents Abbe's number for the d line, respectively. Here, aspheric surfaces are indicated with surface numbers i affixed with * (asterisk).

Numerical Data Example 1

Basic lens data are shown below.
f = 2.80 mm, Fno = 2.6, ω = 32.0°
Unit: mm

Surface Data

| Surface Number i | R | d | Nd | νd |
|---|---|---|---|---|
| (Object) | ∞ | ∞ | | |
| 1 | ∞ | 0.020 | | |
| 2* | 1.219 | 0.533 | 1.5351 | 56.1 |
| 3* | 270.628 | 0.392 (=T1) | | |
| 4* | −1.892 | 0.319 | 1.5837 | 30.1 |
| 5* | 1.953 (=R2r) | 0.245 (=T2) | | |
| 6* | 0.714 (=R3f) | 0.710 | 1.5351 | 56.1 |
| 7* | 1.395 | 0.200 | | |
| 8 | ∞ | 0.300 | 1.5163 | 64.1 |
| 9 | ∞ | 0.685 | | |
| (Image plane) | ∞ | | | | f12 = 24.80 mm
Aspheric Surface Data

Second Surface k = −1.000E−01, $A_4$ = −1.315E−01, $A_6$ = 2.795E−01, $A_8$ = −1.884, $A_{10}$ = 3.065, $A_{12}$ = −2.500
Third Surface k = −1.000E−01, $A_4$ = −4.340E−01, $A_6$ = 1.093, $A_8$ = −8.623, $A_{10}$ = 2.729E+01,
$A_{12}$ = −4.050E+01, $A_{14}$ = 1.900E+01
Fourth Surface k = 0.000, $A_4$ = −1.528, $A_6$ = 5.591, $A_8$ = −2.050E+01, $A_{10}$ = 5.542E+01, $A_{12}$ = −7.747E+01, $A_{14}$ = 4.288E+01
Fifth Surface k = −9.367E+01, $A_4$ = −1.865, $A_6$ = 6.650, $A_8$ = −1.634E+01, $A_{10}$ = 2.848E+01, $A_{12}$ = −2.594E+01, $A_{14}$ = 9.403
Sixth Surface k = −5.967, $A_4$ = −4.018E−01, $A_6$ = 2.293E−01, $A_8$ = −1.049E−01, $A_{10}$ = 3.730E−02, $A_{12}$ = −5.939E−03, $A_{14}$ = 6.771E−03, $A_{16}$ = −2.685E−03
Seventh Surface k = −4.152, $A_4$ = −2.748E−01, $A_6$ = 1.264E−01, $A_8$ = −3.001E−02, $A_{10}$ = −2.374E−02, $A_{12}$ = 1.774E−02, $A_{14}$ = −3.884E−03, $A_{16}$ = −3.969E−05

The values of the respective conditional expressions are as follows:

$f12/f$=8.85

$T1/T2$=1.60

$R2r/R3f$=2.74

$R2r/f$=0.70

Accordingly, the imaging lens of Numerical Data Example 1 satisfies the conditional expressions (1) to (4). A distance on the optical axis from the object-side surface of the first lens L1 to the image plane IM (the thickness of the filter 10 is a length in air, which is hereinafter the same) is 3.28 mm, and miniaturization of the imaging lens is suitably attained.

Figure 2:
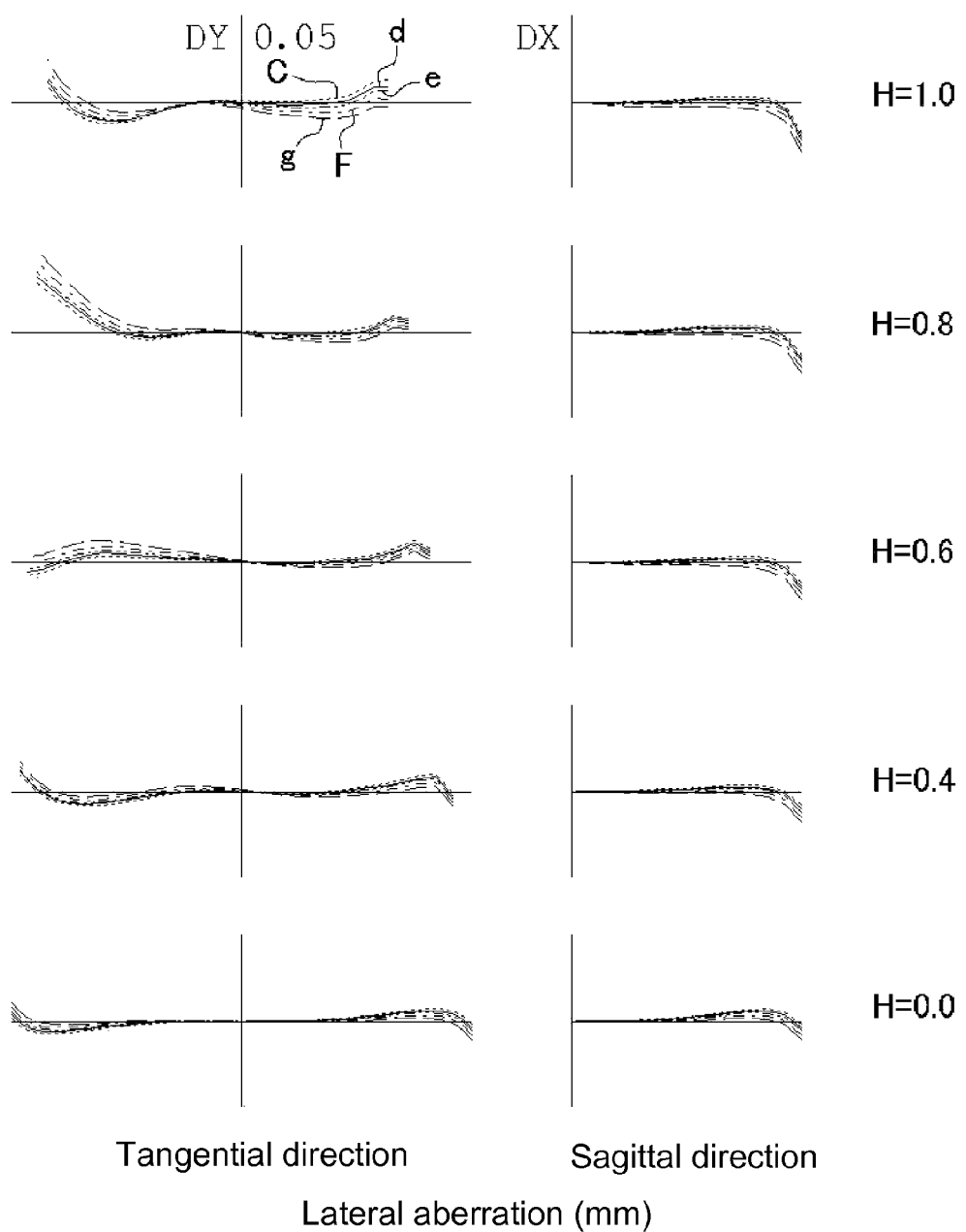
FIG. 2 is an aberration diagram showing a lateral aberration of the imaging lens of FIG. 1.
Figure 3:
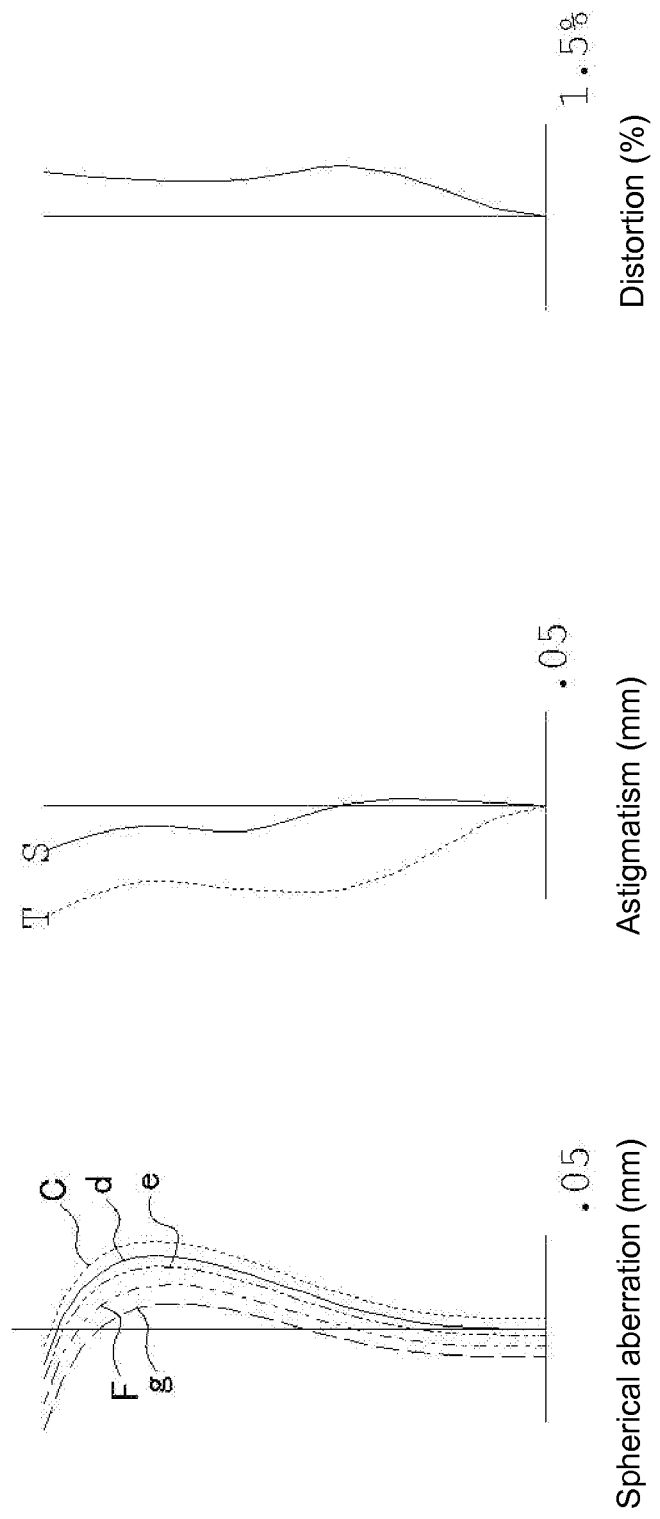
FIG. 3 is an aberration diagram showing a spherical aberration, an astigmatism, and a distortion of the imaging lens of FIG. 1.

FIG. 2 shows a lateral aberration that corresponds to a ratio H of each image height to the maximum image height (hereinafter referred to as "image height ratio H"), which is divided into a tangential direction and a sagittal direction (which is also the same in FIGS. 5 and 8). Furthermore, FIG. 3 shows a spherical aberration (mm), an astigmatism (mm), and a distortion (%), respectively. In the aberration diagrams, for the lateral aberration diagrams and spherical aberration diagrams, aberrations at each wavelength, i.e. a g line (435.84 nm), an F line (486.13 nm), an e line (546.07 nm), a d line (587.56 nm), and a C line (656.27 nm), are indicated. In the astigmatism diagram, an aberration on a sagittal image surface S and an aberration on a tangential image surface T are respectively indicated (which are the same in FIGS. 6 and 9). As shown in FIGS. 2 and 3, according to the imaging lens of Numerical Data Example 1, the image surfaces are satisfactorily corrected and the aberrations are satisfactorily corrected.

Numerical Data Example 2

Basic lens data are shown below.
f = 2.44 mm, Fno = 2.8, ω = 35.6°
Unit: mm

Surface Data

| Surface Number i | R | d | Nd | νd |
|---|---|---|---|---|
| (Object) | ∞ | ∞ | | |
| 1 | ∞ | −0.060 | | |
| 2* | 1.130 | 0.468 | 1.5351 | 56.1 |
| 3* | −10.081 | 0.347 (=T1) | | |
| 4* | −1.466 | 0.264 | 1.6142 | 26.0 |
| 5* | 2.827 (=R2r) | 0.262 (=T2) | | |
| 6* | 0.685 (=R3f) | 0.669 | 1.5351 | 56.1 |
| 7* | 1.166 | 0.320 | | |
| 8 | ∞ | 0.200 | 1.5163 | 64.1 |
| 9 | ∞ | 0.429 | | |
| (Image plane) | ∞ | | | | f12 = 10.26 mm
Aspheric Surface Data

Second Surface $k = -1.136E-01$, $A_4 = -1.960E-01$, $A_6 = 4.231E-01$, $A_8 = -6.682$, $A_{10} = 1.496E+01$, $A_{12} = -2.252E+01$
Third Surface $k = 0.000$, $A_4 = -8.476E-01$, $A_6 = 3.284$, $A_8 = -3.331E+01$, $A_{10} = 1.478E+02$, $A_{12} = -3.363E+02$, $A_{14} = 2.821E+02$
Fourth Surface $k = 0.000$, $A_4 = -2.665$, $A_6 = 1.405E+01$, $A_8 = -7.699E+01$, $A_{10} = 3.044E+02$, $A_{12} = -5.980E+02$, $A_{14} = 4.344E+02$
Fifth Surface $k = -1.074E+02$, $A_4 = -3.256$, $A_6 = 1.698E+01$, $A_8 = -6.174E+01$, $A_{10} = 1.548E+02$, $A_{12} = -2.073E+02$, $A_{14} = 1.132E+02$
Sixth Surface $k = -5.416$, $A_4 = -6.065E-01$, $A_6 = 6.036E-01$, $A_8 = -4.126E-01$, $A_{10} = 1.660E-01$, $A_{12} = -8.236E-02$, $A_{14} = 6.905E-02$, $A_{16} = -2.028E-02$ -continued Basic lens data are shown below.
f = 2.44 mm, Fno = 2.8, ω = 35.6°
Unit: mm Seventh Surface $k = -2.206$, $A_4 = -5.149E-01$, $A_6 = 3.978E-01$, $A_8 = -1.060E-01$, $A_{10} = -1.347E-01$, $A_{12} = 1.338E-01$, $A_{14} = -4.720E-02$, $A_{16} = 5.590E-03$ The values of the respective conditional expressions are as follows:

$f12/f=4.20$ $T1/T2=1.32$ $R2r/R3f=4.13$ $R2r/f=1.16$

Accordingly, the imaging lens of Numerical Data Example 2 satisfies the conditional expressions (1) to (4). A distance on the optical axis from the object-side surface of the first lens L1 to the image plane IM is 2.89 mm, and miniaturization of the imaging lens is suitably attained.

Figure 5:
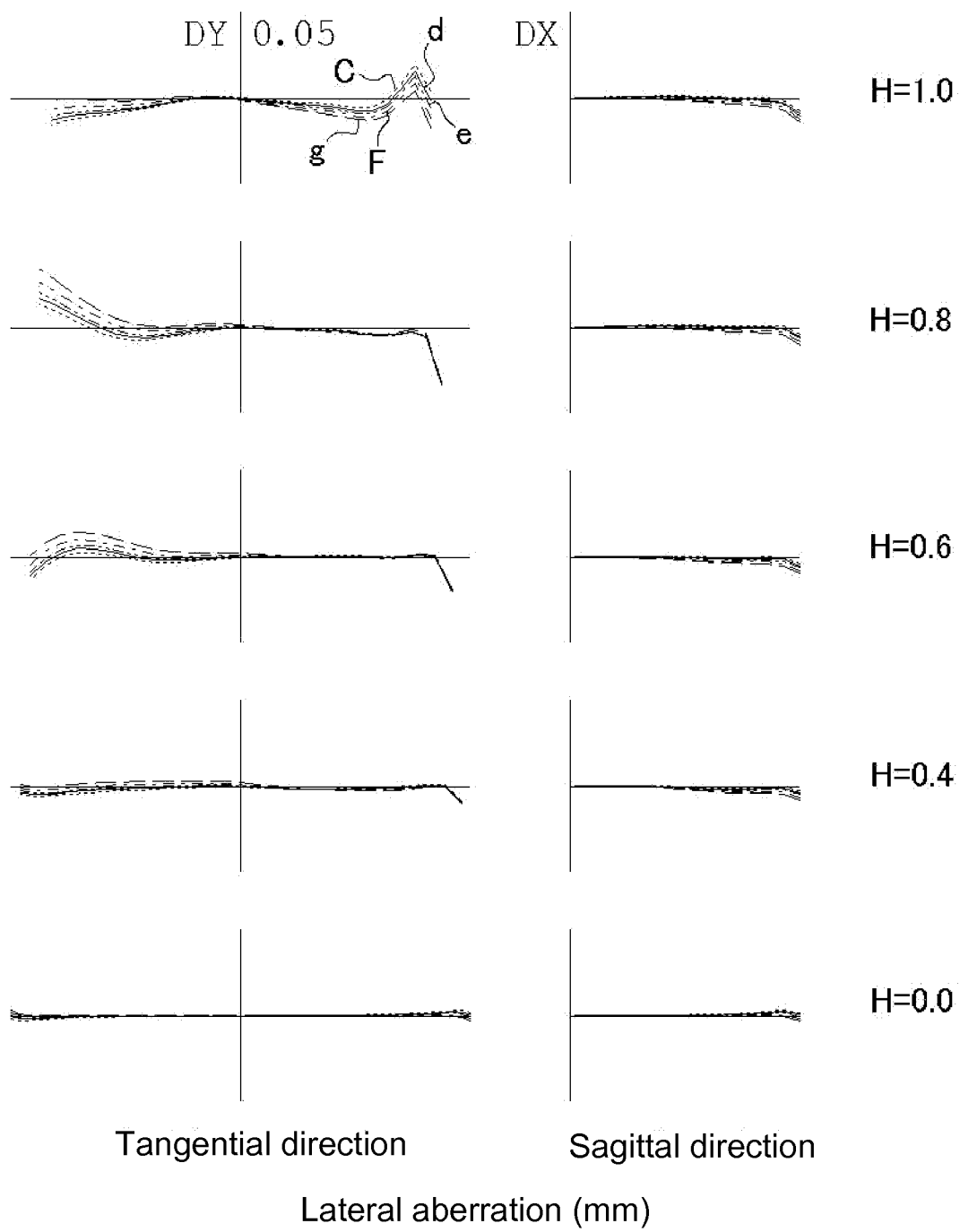
FIG. 5 is an aberration diagram showing a lateral aberration of the imaging lens of FIG. 4.
Figure 6:
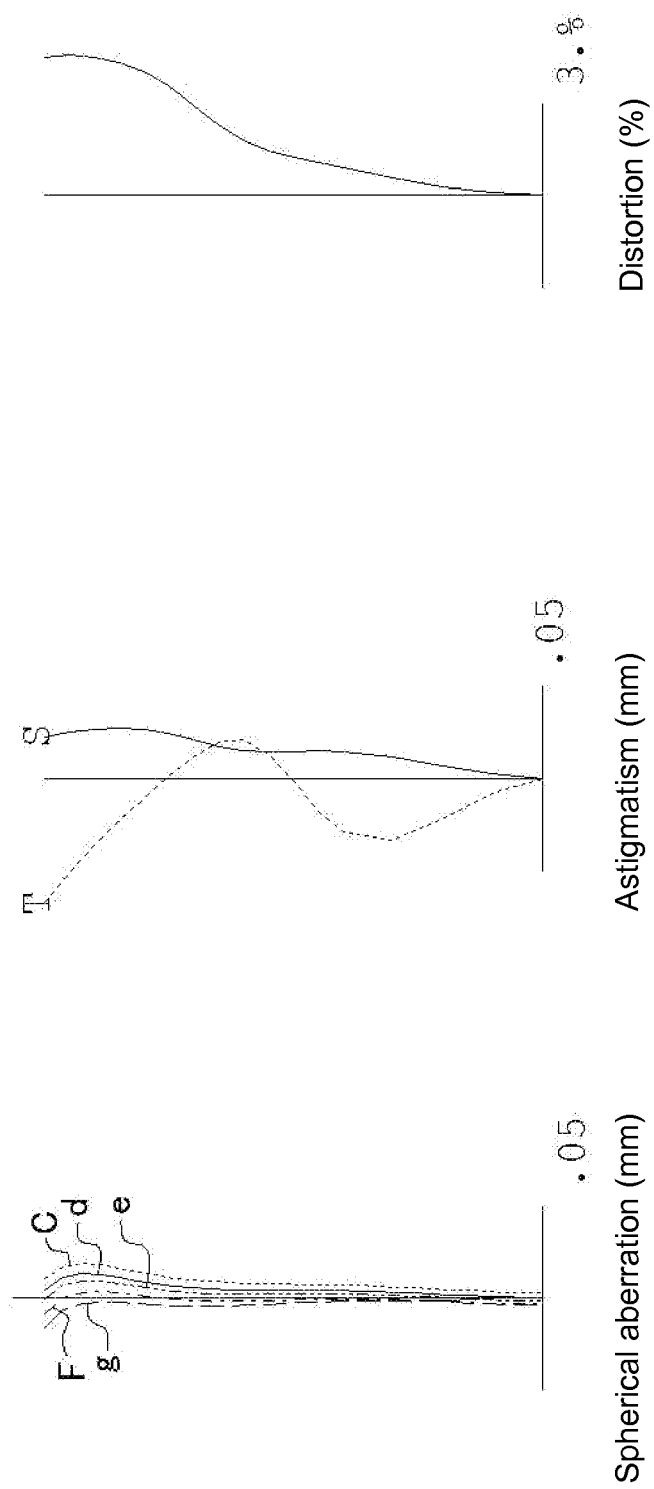
FIG. 6 is an aberration diagram showing a spherical aberration, an astigmatism, and a distortion of the imaging lens of FIG. 4.

FIG. 5 shows the lateral aberration that corresponds to the image height ratio H of the imaging lens of Numerical Data Example 2. FIG. 6 shows a spherical aberration (mm), an astigmatism (mm), and a distortion (%), respectively, in the imaging lens of Numerical Data Example 2. As shown in FIGS. 5 and 6, according to the imaging lens of Numerical Data Example 2, the image surfaces are satisfactorily corrected and the aberrations are suitably corrected.

Numerical Data Example 3

Basic lens data are shown below.
f = 2.62 mm, Fno = 2.6, ω = 33.8°
Unit: mm

Surface Data

| Surface Number i | R | d | Nd | νd |
|---|---|---|---|---|
| (Object) | ∞ | ∞ | | |
| 1 | ∞ | −0.060 | | |
| 2* | 1.091 | 0.472 | 1.5351 | 56.1 |
| 3* | 10.865 | 0.421 (=T1) | | |
| 4* | −1.217 | 0.280 | 1.5837 | 30.1 |
| 5* | 10.000 (=R2r) | 0.242 (=T2) | | |
| 6* | 0.821 (=R3f) | 0.743 | 1.5351 | 56.1 |
| 7* | 1.777 | 0.200 | | |
| 8 | ∞ | 0.300 | 1.5163 | 64.1 |
| 9 | ∞ | 0.582 | | |
| (Image plane) | ∞ | | | | f12 = 10.56 mm
Aspheric Surface Data

Second Surface $k = -4.900$, $A_4 = 4.158E-01$, $A_6 = -4.115E-01$, $A_8 = -1.068$, $A_{10} = 3.734$, $A_{12} = -5.274$ -continued Basic lens data are shown below.
f = 2.62 mm, Fno = 2.6, ω = 33.8°
Unit: mm Third Surface $k = 2.677E{-}02, A_4 = -2.415E{-}01, A_6 = -3.388E{-}01, A_8 = 7.147E{-}01,$
$A_{10} = -2.887, A_{12} = -2.448$ Fourth Surface $k = -8.493, A_4 = -1.418, A_6 = -8.091E{-}02, A_8 = 3.469E{+}01, A_{10} =$
$-1.962E{+}02, A_{12} = 4.734E{+}02, A_{14} = -4.435E{+}02$ Fifth Surface $k = -3.000E{+}02, A_4 = -2.073, A_6 = 7.373, A_8 = -1.509E{+}01, A_{10} =$
$2.079E{+}01, A_{12} = -1.333E{+}01, A_{14} = 1.611$ Sixth Surface $k = -6.310, A_4 = -5.243E{-}01, A_6 = 6.774E{-}01, A_8 = -5.148E{-}01,$
$A_{10} = 1.492E{-}01, A_{12} = -1.744E{-}03$ Seventh Surface $k = 3.344E{-}01, A_4 = -3.967E{-}01, A_6 = 1.381E{-}01, A_8 = -7.118E{-}03,$
$A_{10} = -2.040E{-}02, A_{12} = -1.287E{-}02, A_{14} = 1.410E{-}02,$
$A_{16} = -3.796E{-}03$ The values of the respective conditional expressions are as follows:

$f12/f = 4.03$ $T1/T2 = 1.74$ $R2r/R3f = 12.18$ $R2r/f = 3.82$

Accordingly, the imaging lens of Numerical Data Example 3 satisfies the conditional expressions (1) to (4). A distance on the optical axis from the object-side surface of the first lens L1 to the image plane IM is 3.14 mm, and miniaturization of the imaging lens is suitably attained.

Figure 8:
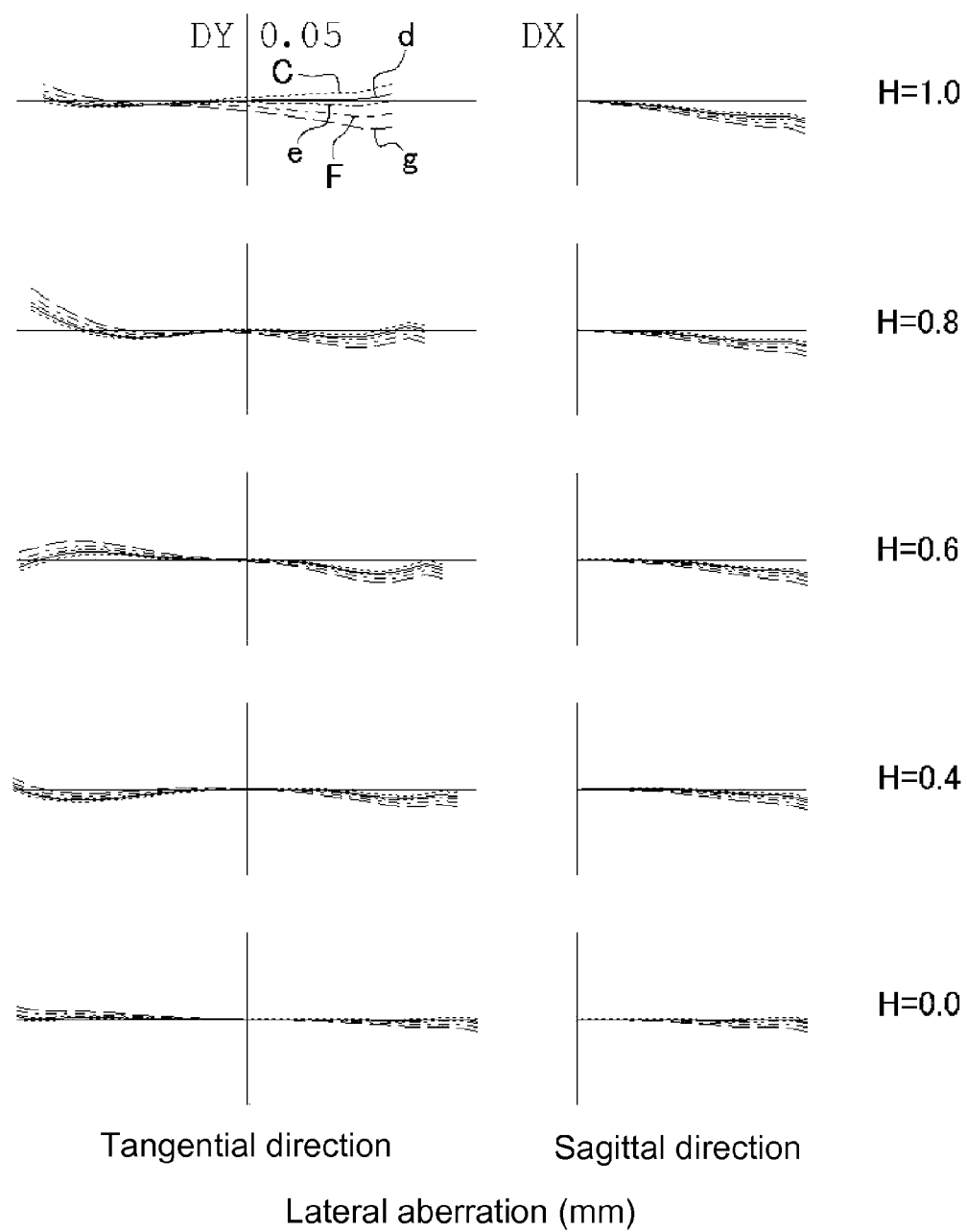
FIG. 8 is an aberration diagram showing a lateral aberration of the imaging lens of FIG. 7.
Figure 9:
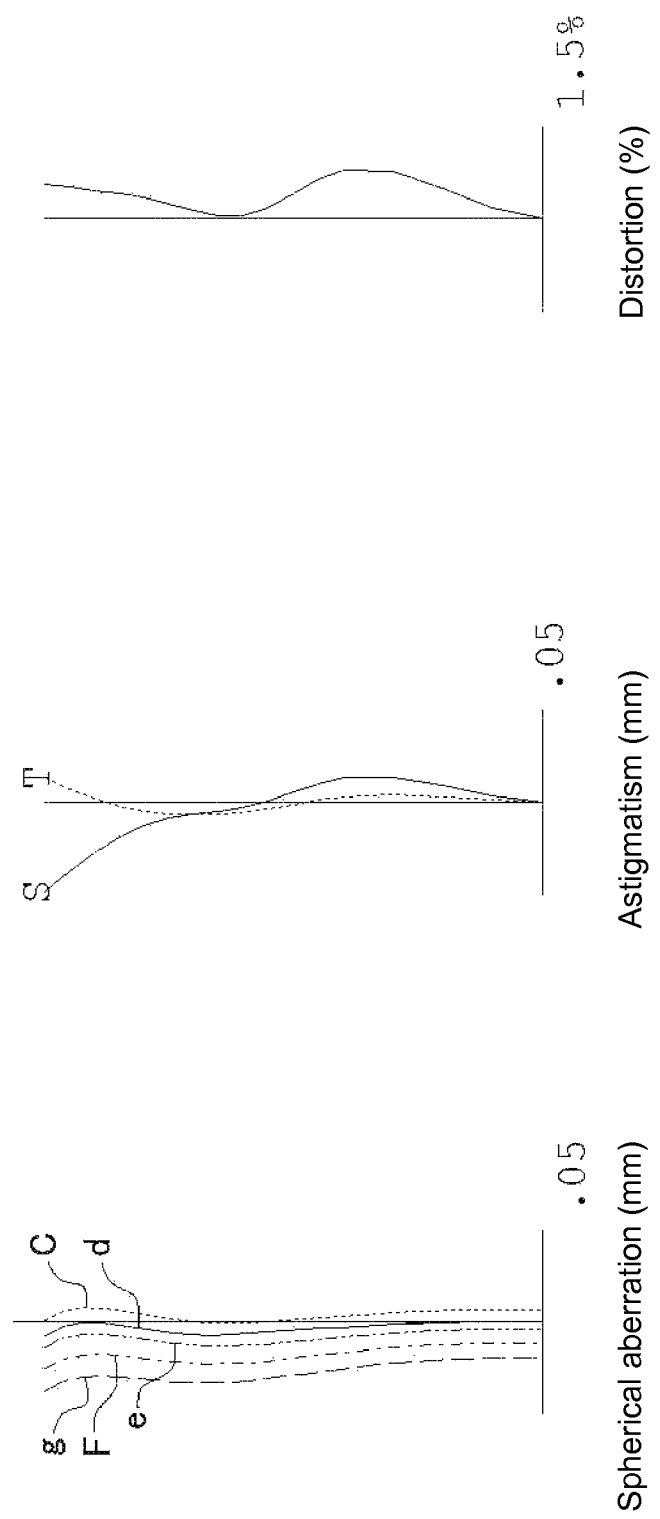
FIG. 9 is an aberration diagram showing a spherical aberration, an astigmatism, and a distortion of the imaging lens of FIG. 7.

FIG. 8 shows the lateral aberration that corresponds to the image height ratio H in the imaging lens of Numerical Data Example 3, and FIG. 9 shows a spherical aberration (mm), an astigmatism (mm), and a distortion (%), respectively, in the imaging lens of Numerical Data Example 3. As shown in FIGS. 8 and 9, also in the imaging lens of Numerical Data Example 3, the image surfaces are satisfactorily corrected and the aberrations are suitably corrected.

Accordingly, when the imaging lens of the embodiment is applied to an imaging optical system of a cellular phone, a digital still camera, a portable information terminal, a security camera, an onboard camera, a network camera, and the like, it is possible to achieve both the high performance and the small size for the camera or the like.

Here, the imaging lens of the invention is not limited to the above-described embodiment. In the above-described embodiment, any surfaces of the first lens L1 through the third lens L3 are formed as aspheric surfaces, but it is not necessary to form all the surfaces as aspheric surfaces.

The invention may be applicable to the imaging lens of a device that is required to have a small size and satisfactory aberration correction ability, e.g., imaging lenses mounted in cellular phones, digital still cameras, and the like.

The disclosure of Japanese Patent Application No. 2011-287076, filed on Dec. 28, 2011, is incorporated in the application by reference.

While the present invention has been explained with reference to the specific embodiments of the present invention, the explanation is illustrative and the present invention is limited only by the appended claims.

What is claimed is:

1. An imaging lens comprising:
   a first lens having positive refractive power, said first lens being formed in a shape so that a curvature radius of a surface thereof on an object side is positive;
   a second lens having negative refractive power, said second lens being formed in a shape so that a curvature radius of a surface thereof on the object side is negative and a curvature radius of a surface thereof on an image plane side is positive; and
   a third lens having positive refractive power, said third lens being formed in a shape so that a curvature radius of a surface thereof on the object side and a curvature radius of a surface thereof on the image plane side are both positive, arranged in this order from the object side to the image plane side,
   wherein said first lens is arranged so that the surface thereof on the image plane side is away from the surface of the second lens on the object side by a distance T1 on an optical axis, and
   said second lens is arranged so that the surface thereof on the image plane side is away from the surface of the third lens on the object side by a distance T2 on the optical axis so that the following conditional expression is satisfied:

$1.6 \leq T1/T2 < 2.0$ said first lens and said second lens have a composite focal length f12 so that the following conditional expression is satisfied:

$4.0 < f12/f < 10.0$ where f is a focal length of a whole lens system.

2. The imaging lens according to claim 1, wherein said second lens has a surface on the image plane side having a curvature radius R2r and said third lens has a surface on the object side having a curvature radius R3f so that the following conditional expression is satisfied:

$2.0 < R2r/R3f < 35.0.$

3. The imaging lens according to claim 1, wherein said second lens has a surface on the image plane side having a curvature radius R2r so that the following conditional expression is satisfied:

$0.6 < R2r/f < 10.0.$

* * * * *